United States Patent
Moon et al.

(10) Patent No.: US 7,683,959 B2
(45) Date of Patent: Mar. 23, 2010

(54) METHOD OF TAKING AN IMAGE WITH MULTIPLE PHOTOGRAPHING MODES AND DIGITAL PHOTOGRAPHING APPARATUS USING THE METHOD

(75) Inventors: Tae-won Moon, Seongnam-si (KR); Kun-sop Kim, Seongnam-si (KR); Byeong-chan Park, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 623 days.

(21) Appl. No.: 11/600,373

(22) Filed: Nov. 16, 2006

(65) Prior Publication Data
US 2007/0291154 A1 Dec. 20, 2007

(30) Foreign Application Priority Data
Jun. 20, 2006 (KR) .................. 10-2006-0055417

(51) Int. Cl.
*H04N 5/222* (2006.01)
(52) U.S. Cl. .................. 348/333.05; 715/788
(58) Field of Classification Search .......... 348/362, 348/345, 333.12, 333.11, 333.05, 333.02, 348/333.01, 223.1, 211.99, 211.8, 207.99, 348/157; 345/200; 715/788, 785, 252
See application file for complete search history.

(56) References Cited

U.S. PATENT DOCUMENTS

| | | | |
|---|---|---|---|
| 6,362,850 B1 * | 3/2002 | Alsing et al. ................ 348/239 |
| 7,050,622 B2 * | 5/2006 | Morishima et al. .......... 382/148 |
| 7,064,858 B2 * | 6/2006 | Iwai et al. .................... 358/1.2 |
| 7,298,409 B1 * | 11/2007 | Misawa ................. 348/333.01 |
| 7,447,425 B2 * | 11/2008 | Gong ........................... 396/60 |
| 7,492,406 B2 * | 2/2009 | Park et al. .............. 348/333.05 |
| 7,525,580 B2 * | 4/2009 | Yoshino .................. 348/240.2 |
| 2001/0012072 A1 * | 8/2001 | Ueno .................... 348/333.02 |
| 2003/0160886 A1 * | 8/2003 | Misawa et al. ............. 348/347 |
| 2004/0175764 A1 * | 9/2004 | Nishiyama et al. ........... 435/7.2 |
| 2005/0083426 A1 * | 4/2005 | Yoo et al. .............. 348/333.05 |
| 2007/0212039 A1 * | 9/2007 | Yumiki ....................... 396/55 |

FOREIGN PATENT DOCUMENTS

| JP | 2004215041 A | * | 7/2004 |
| JP | 2006005640 A | * | 1/2006 |
| WO | WO 2005091620 A1 | * | 9/2005 |

* cited by examiner

*Primary Examiner*—Lin Ye
*Assistant Examiner*—Nelson D Hernández Hernández
(74) *Attorney, Agent, or Firm*—Drinker Biddle & Reath LLP

(57) ABSTRACT

A method of controlling a digital photographing apparatus that can easily determine a quality of a photographed image from an image displayed on a display panel included in the digital photographing apparatus, and the digital photographing apparatus using the method. The method includes: performing photographing operation in two or more photographing modes to obtain photographed images in response to a single activation of a shutter button; and displaying simultaneously: (1) a plurality of first images obtained by reducing the photographed images or by reducing the photographed images that are corrected, and (2) a plurality of second images that correspond to parts of the first images.

21 Claims, 7 Drawing Sheets

METHOD OF TAKING AN IMAGE WITH MULTIPLE PHOTOGRAPHING MODES AND DIGITAL PHOTOGRAPHING APPARATUS USING THE METHOD

CROSS-REFERENCE TO RELATED PATENT APPLICATIONS

This application claims the benefit of Korean Patent Application No. 10-2006-0055417, filed on Jun. 20, 2006, in the Korean Intellectual Property Office, the disclosure of which is incorporated herein in its entirety by reference.

BACKGROUND OF THE INVENTION

1. Field of the Invention

The present invention relates to a method of controlling a digital photographing apparatus and a digital photographing apparatus using the method, and more particularly, to a method of controlling a digital photographing apparatus that easily determines image quality from images displayed on a display panel included in the digital photographing apparatus, and a digital photographing apparatus using the method.

2. Description of the Related Art

In general, digital photographing apparatuses store image files obtained by photographing operations in a storage medium, and display the image files stored in the storing medium in a display mode. The image files can also be displayed in a photographing mode.

Conventional digital photographing apparatuses display entirely reduced images of photographed images on a display panel in the display mode. However, when the photographed images have imperfections and are not clear due to, for example, shaking of the camera or movement of the photographed subject, the imperfections of the reduced images are not perceptible and appear on the display panel as if they are photographed clearly. In addition, when noise exists in photographed images due to sensitivity problems, the noise is not perceptible in the reduced images displayed on the display panel, and the photographed images are displayed as if they are clear. Therefore, a user has to enlarge and examine the reduced images in order to identify whether there are imperfections in the photographed images. In addition, besides the clarity of the images, the reduced images frequently have to be enlarged to determine if the images are photographed as the user intended.

In addition, in conventional digital photographing apparatuses, when a plurality of images of similar subjects to each other are displayed on the display panel simultaneously, the entirely reduced images of the photographed images are displayed on the display panel. Therefore, it is difficult to check individual characteristic of the plurality of images of the similar subjects on the display panel. Thus, if the user wants to choose an image that is photographed as the user intended from the plurality of similar images, the reduced images have to be enlarged and identified again, thereby increasing inconvenience.

SUMMARY OF THE INVENTION

The present invention provides a method of controlling a digital photographing apparatus that can easily determine image quality of images displayed on a display panel of a digital photographing apparatus, and a digital photographing apparatus using the method.

According to an aspect of the present invention, there is provided a method of controlling a digital photographing apparatus, the method including: performing photographing operations in two or more photographing modes to obtain photographed images in response to a single activation of the shutter button; and displaying a plurality of first images obtained by reducing the photographed images or by reducing the photographed images that are corrected, and a plurality of second images that correspond to parts of the first images on a display panel at the same time.

The second images may be reduced images of the original photographed images having a smaller reduction ratio than that of the first images, may be the same size as the original photographed images, or may be enlarged images of the original photographed images.

The reduction ratio or an enlargement ratio of the second images may be set by a user in advance, may be changed by the user when the photographed images are displayed on the display panel, or may be automatically changed with the passage of time when the photographed images are displayed on the display panel.

The change of the reduction ratio or the enlargement ratio of the second images may be set by the user in advance.

The second images may correspond to parts of the first images and this set by the user in advance.

The second images may correspond to center parts of the first images.

The parts of the first images corresponding to the second images may be automatically changed with the passage of time when the photographed images are displayed on the display panel.

Centers of the parts of the first images corresponding to the second images may be moved.

The centers of the parts of the first images corresponding to the second images may be moved along a path set by the user in advance.

The centers of the parts of the first images corresponding to the second images may be moved along a random path.

Areas of the parts of the first images corresponding to the second images may be changed.

The areas of the parts of the first images corresponding to the second images may be changed according to a setting determined by the user in advance.

The areas of the parts of the first images corresponding to the second images may be changed randomly.

Indication lines denoting the parts corresponding to the second images may be represented on the first images.

The position of the indication lines may be moved by the user when the photographed images are displayed on the display panel, and the second images may be changed according to the movement of the indication lines.

Obtaining photographed images in two or more photographing modes when the shutter button signal is input once may be performed for the same subject.

The two or more photographing modes may comprise one selected from the group consisting of a normal mode, a shake reduction mode, a flash mode, an exposure adjust mode, a sensitivity adjust mode, an aperture adjust mode, and a shutter speed adjust mode.

The method may further include: storing a first image selected from the plurality of first images.

According to another aspect of the present invention, there is provided a digital photographing apparatus using the above controlling method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
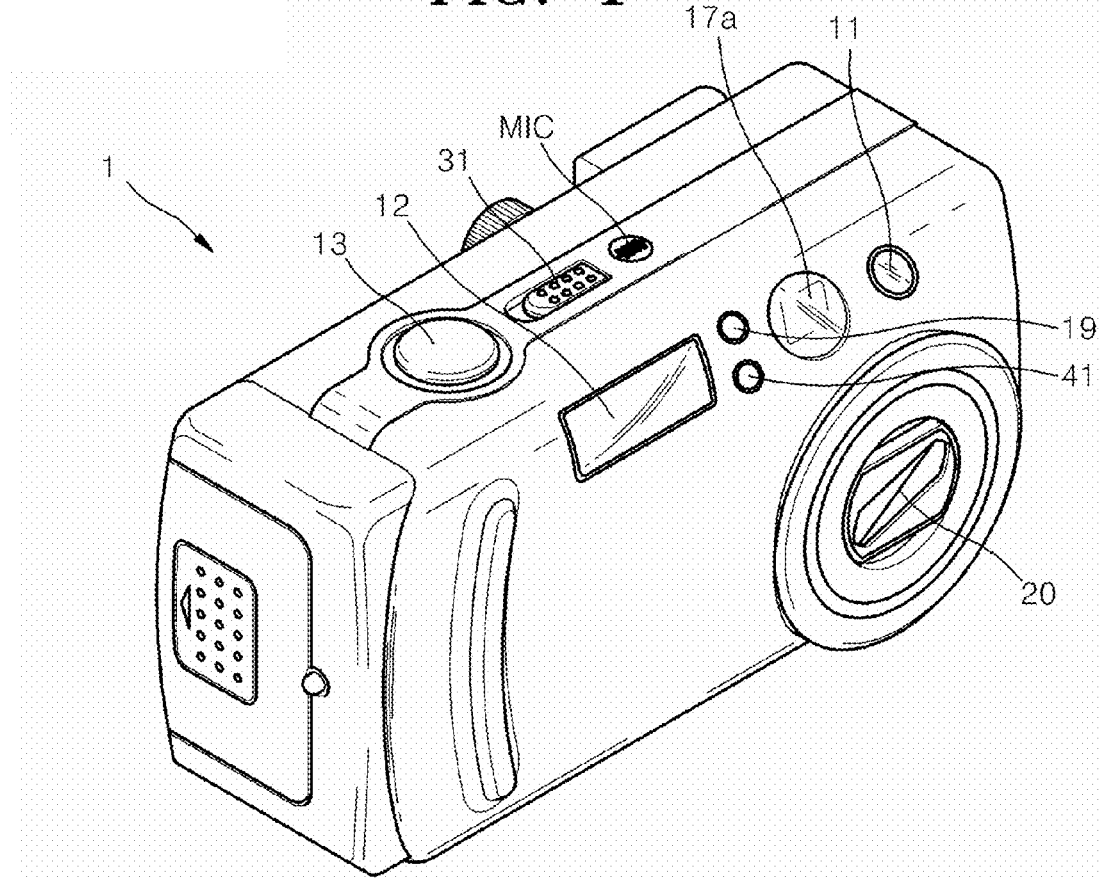
FIG. 1 is a schematic perspective view of a digital camera according to an embodiment of the present invention.
Figure 2:
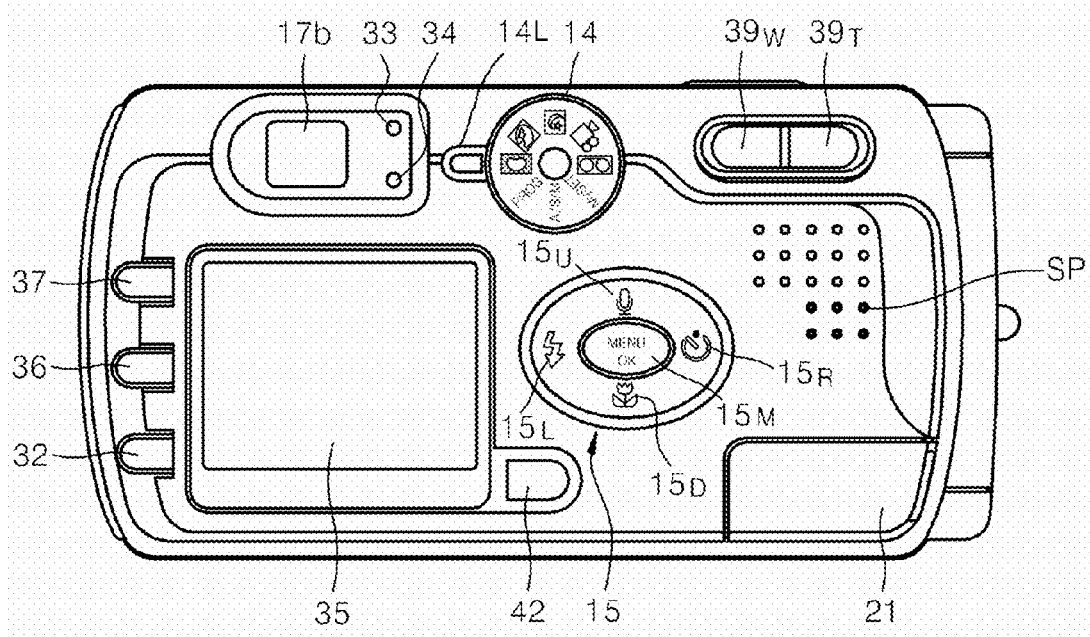
FIG. 2 is a schematic view of a rear surface of the digital camera of FIG. 1, according to an embodiment of the present invention.

FIG. 1 is a schematic perspective view of a digital photographing apparatus, that is, a digital camera 1, according to an embodiment of the present invention, and FIG. 2 is a schematic view of a rear surface of the digital camera 1 of FIG. 1. It should be noted that, while the invention is described herein in connection with a digital camera, the invention may be implemented and applies to any imaging apparatus including, for example, a camera phone, a camcorder, a single lens reflex (SLR) camera, etc.

Referring to FIG. 1, a front portion of the digital camera 1 includes a microphone (MIC), a self-timer lamp 11, a flash 12, a shutter release button 13, a viewfinder 17a, a flash-light intensity sensor 19, a power switch 31, a lens unit 20, and a remote receiver 41.

The self-timer lamp 11 operates for a set period of time from the time when the shutter release button 13 is pressed to the time when a shutter operates in a self-timer mode. The flash-light intensity sensor 19 senses the intensity of the light generated by the flash 12 and relays the sensed intensity of the light to a digital camera processor (not shown) via a micro-controller (not shown). The remote receiver 41 receives command signals, for example, a photographing command signal, from a remote controller (not shown) and relays the photographing command signal to the digital camera processor via the micro-controller.

Referring to FIG. 2, the back of the digital camera 1 according to the current embodiment of the present invention includes a mode dial 14, functional buttons 15, a manual focus/delete/reduce button 36, a manual adjust/display/stop/enlarge button 37, a display mode button 42, a speaker SP, a monitor button 32, an automatic focusing lamp 33, a viewfinder 17b, a flash standby lamp 34, a display panel 35, a wide angle-zoom button 39W, a telephoto-zoom button 39T, and an external interface unit 21.

The mode dial 14 is used for selecting any one of the operating modes of the digital camera 1 such as a simple photographing mode, a program photographing mode, a character photographing mode, a night view photographing mode, a manual photographing mode, a moving-image photographing mode, a user setting mode, and a voice recording mode.

The functional buttons 15 are used for operating specific functions of the digital camera 1 and the functional buttons 15 are also used as control buttons to manage the movement of images displayed on the display panel 35 in the display mode, or as control buttons for moving an active cursor on a menu screen of the display panel 35.

The manual adjust/display/stop/enlarge button 37 is used for manual adjustment of specific conditions. In addition, in the display mode, when the user pushes the manual adjust/reproduce/stop/enlarge button 37 when a moving-picture file is selected, the selected moving-picture file can be displayed or stopped. In addition, a reduction ratio or an enlargement ratio of a second image on the display panel 35 can be increased, which will be described later.

The manual focus/delete/reduce button 36 is used for manually focusing in the photographing mode, deleting images, or changing the reduction or the enlargement ratio of the second image on the display panel 35, which will be described later. The monitor button 32 is used for controlling the operation of the display panel 35. The display mode button 42 is used for switching between the display mode and the photographing mode.

The automatic focusing lamp 33 operates when a focus is well adjusted. The flash standby lamp 34 operates when the flash 12 is in a standby mode. A mode indicating lamp 14L indicates a selection mode of the mode dial 14.

Figure 3:
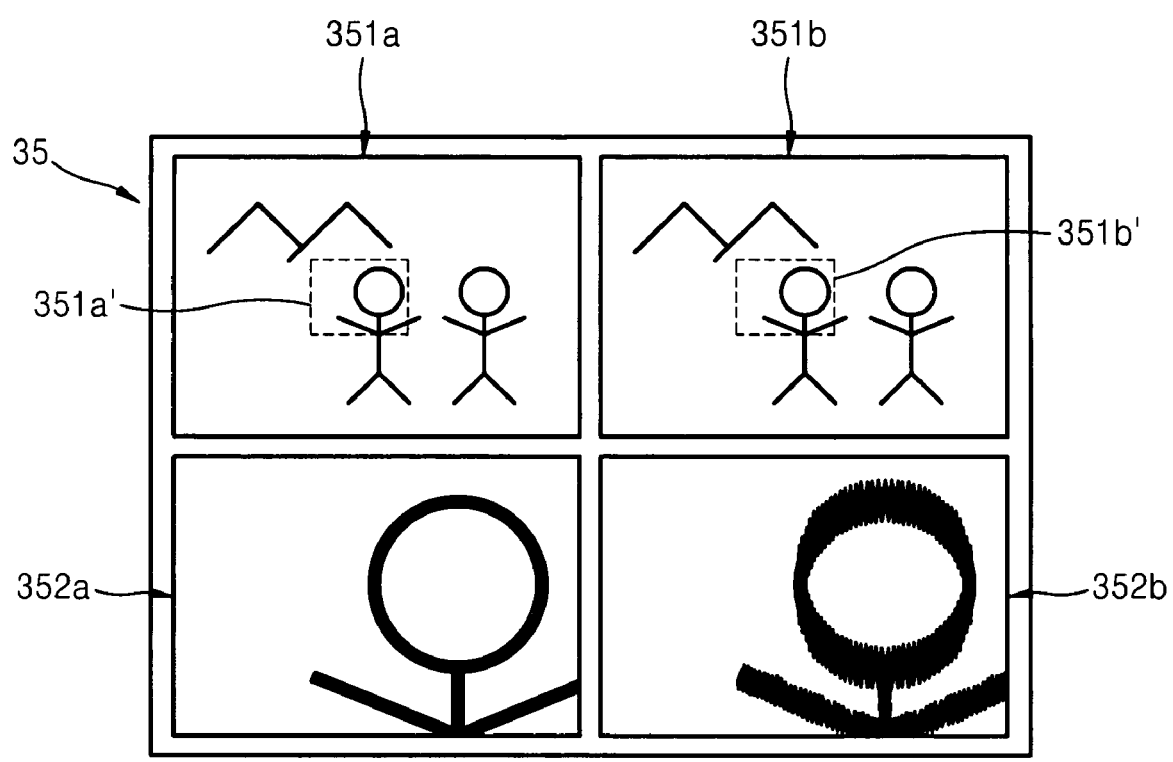
FIG. 3 is an example of images displayed on a display panel of the digital photographing apparatus using a method of controlling the digital photographing apparatus according to an embodiment of the present invention.

FIG. 3 is an example of a view of photographed images displayed on the display panel 35 using a method of controlling the digital photographing apparatus, that is, the digital camera 1 of FIG. 1, according to an embodiment of the present invention.

Referring to FIG. 3, when the photographed images are displayed on the display panel 35 according to the current embodiment of the present invention, first images 351a and 351b and second images 352a and 352b can be displayed simultaneously.

The first images 351a and 351b are reduced whole images of the photographed images, and the second images 352a and 352b are partial images of the first images 351a and 351b. The first images 351a and 351b are images photographed in different modes from each other during a single activation of the shutter button. In FIG. 3, two first images 351a and 351b are displayed, however, three or more images can be photographed for a single activation of the shutter button, and thus, three or more first images can be displayed on the display panel 35. In the embodiment of the invention illustrated in FIG. 3, two first images 351a and 351b are displayed.

The first images 351a and 351b will be described in more detail as follows.

In the digital photographing apparatus, the light from the subject passing through the lens is incident into an imaging device, and thereby an image of the subject is obtained. At this time, a sufficient amount of light should be incident into the imaging device. Therefore, in a case where the intensity of the light from the subject is not sufficient, shutter speed is reduced to increase the exposure time and to ensure a sufficient amount of light. However, in a case where the shutter speed is slow, the clarity of the image may be degraded due to shaking of the digital photographing apparatus or movement of the subject.

In order to solve the above problem, a shake reduction mode, a flash mode, a sensitivity adjust mode, or an aperture adjust mode can be used. The shake reduction mode can be performed in various ways, for example, photographing under a long exposure time and photographing under a short exposure time are performed, and then, the images obtained under the long and short exposure times are combined. When images are obtained under the short exposure time, the sensitivity of the digital photographing apparatus is increased to obtain an image of sufficient brightness regardless of the short exposure period. Therefore, the clarity degradation of the image during the photographing operation under the long exposure period can be reduced or prevented. The flash mode makes the image photographed with rapid shutter speed by increasing the intensity of light incident into the imaging device of the digital photographing apparatus using the flash. In the sensitivity adjust mode, the sensitivity of the digital photographing apparatus is increased so that photographing can be performed with rapid shutter speed when the light intensity is weak. In the aperture adjust mode, an aperture value is reduced to increase opening of the aperture, and thus, the intensity of the light incident into the imaging device of the digital photographing apparatus is relatively increased so that photographing can be performed with rapid shutter speed.

However, it is not easy to determine what image among the images photographed in various modes is clearly taken or suitable to the user in advance. According to circumstances, the image photographed in the shake reduction mode may be more suitable for the user than the images photographed in other modes. Sometimes, the image photographed in the normal mode may be suitable for the user. The photographing should be independently performed in each of the normal mode, the shake reduction mode, the flash mode, the exposure adjust mode, the sensitivity adjust mode, the aperture adjust mode, and the shutter speed adjust mode. In addition, each of the photographed images may be displayed on the display panel separately so that the user can compare the images.

Therefore, according to the invention, a plurality of photographing operations are performed in different modes upon one activation of the shutter button signal is activated once. That is, the same subject is photographed a plurality of times in different modes when the shutter button signal is input once. The photographing mode is one selected from the group consisting of the normal mode, the shake reduction mode, the flash mode, the exposure adjust mode, the sensitivity adjust mode, the aperture adjust mode, and the shutter speed adjust mode. In FIG. 3, for example, the subject is photographed twice in two different modes.

In addition, in an embodiment of the present invention, the images obtained from the different photographing modes are displayed on the display panel 35 simultaneously. That is, a plurality of first images 351a and 351b, which are images obtained by reducing entire photographed images or by reducing entire photographed images that are compensated, are displayed. As described above, since the plurality of first images 351a and 351b photographed in different modes from each other are displayed on the display panel 35 at the same time, the images photographed in the different modes can be readily compared to each other.

In addition, in a conventional digital photographing apparatus, in a display mode of photographed images, reduced images of the photographed images can be displayed on the display panel only as whole images. In this case, even when the photographed images are not clear due to shaking of the camera or the subject, the reduced images are displayed on the display panel and such imperfections are not perceptible, the images appear to be clearly photographed. For example, in FIG. 3, the left second image 352a and the right second image 352b have different clarity from each other, however, the left first image 351a and the right first image 351b that are obtained by reducing the entire photographed images may appear identical to the user. When noise exists in a photographed image, the noise reduced image of the entire photographed image. In addition, if images are photographed using different aperture values from each other, the images obtained by reducing the entire photographed images may not show the effects generated due to the different aperture values, and thus, the reduced images may appear identical to the user.

Therefore, in a conventional digital photographing apparatus, in order for the user to identify whether a photographed image is clear or not, the reduced image of the entire photographed image must be enlarged, thereby increasing inconvenience. In addition, besides the clarity of the image, the reduced image must also be enlarged in order to determine whether the image is photographed as desired by the user.

In the method of controlling the digital photographing apparatus according to the current embodiment of the present embodiment, a plurality of second images 352a and 352b that are partial images of the first images 351a and 351b are displayed on the display panel 35 simultaneously.

As described above, when the photographed images are displayed on the display panel 35, the first images 351a and 351b that are obtained by reducing the entire photographed images, and the second images 352a and 352b that are partial images of the first images 351a and 351b are displayed at the same time. Thus, the user can easily determine the general image quality or status, and the detailed quality or status of the images. Referring to FIG. 3, indication lines 351a' and 351b' can be displayed on the first images 351a and 351b if necessary. The indication lines 351a' and 351b' denote the parts of the first images 351a and 351b corresponding to the second images 352a and 352b.

The second images 352a and 352b may also be reduced images. In this case, the reduction ratio of the second images 352a and 352b is smaller than that of the first images 351a and 351b, and consequently, the second images 352a and 352b become the images obtained by enlarging some parts of the first images 351a and 351b. The reduction ratio of the second images 352a and 352b may be set by the user in advance, or may be an initially fixed ratio. The second images 352a and 352b displayed on the display panel 35 may be original images that are not reduced, or enlarged images of the original images. If the second images 352a and 352b are the enlarged images of the original images, the enlargement ratio of the second images 352a and 352b may be set by the user in advance, or may be an initially fixed ratio. When the reduction ratio and the enlargement ratio of the second images 352a and 352b are 0, the second images 352a and 352b are the original images.

Since the first images 351a and 351b and the second images 352a and 352b are simultaneously displayed on the display panel 35, the user can readily determine the general status of the images that are photographed in different modes from the first images 351a and 351b, and at the same time, can identify detailed properties of the images such as the clarity of the images from the second images 352a and 352b.

Figure 4:
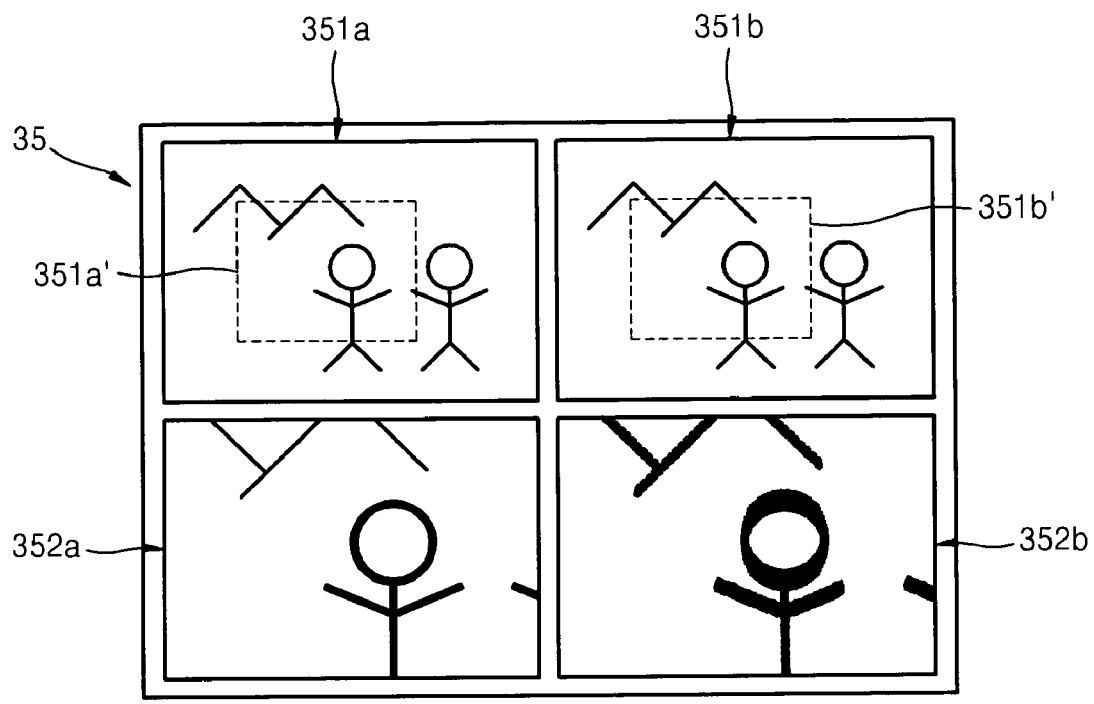
FIG. 4 is an example of images displayed on the display panel using a method of controlling the digital photographing apparatus according to another embodiment of the present invention.

When photographed images are displayed on the display panel 35, the user can change the reduction ratio or the enlargement ratio of the second images 352a and 352b. For example, referring to FIG. 4, the centers of the parts of the first images 351a and 351b corresponding to the second images 352a and 352b are the same as those of FIG. 3, however, the reduction ratio or the enlargement ratio of the second images 352a and 352b can be changed. In the example illustrated in FIG. 4, the reduction or the enlargement ratio of the second images 352a and 352b is less than the reduction ratio or the enlargement ratio of the second images 352a and 352b of the example illustrated in FIG. 3. The reduction ratio or the enlargement ratio of the second images 352a and 352b can be adjusted using the manual focus/delete/reduce button 36 and the manual adjust/display/stop/enlarge button 37. Also, other buttons or mechanisms can be used to change the reduction ratio or the enlargement ratio of the second images 352a and 352b.

In addition, when the first images 351a and 351b and the second images 352a and 352b are displayed on the display panel 35, the reduction ratio or the enlargement ratio of the second images 352a and 352b can be automatically changed with the passage of time. The reduction ratio or the enlargement ratio of the second images 352a and 352b can be set by the user in advance to change with the passage of time, or can be initially fixed.

The parts of the first images 351a and 351b that become the second images 352a and 352b may be fixed, and in this case, the second images 352a and 352b may be set to correspond to center parts of the first images 351a and 351b. This is because the subject to be photographed by the digital photographing apparatus is generally located in the center portion of the image to be obtained.

Figure 5:
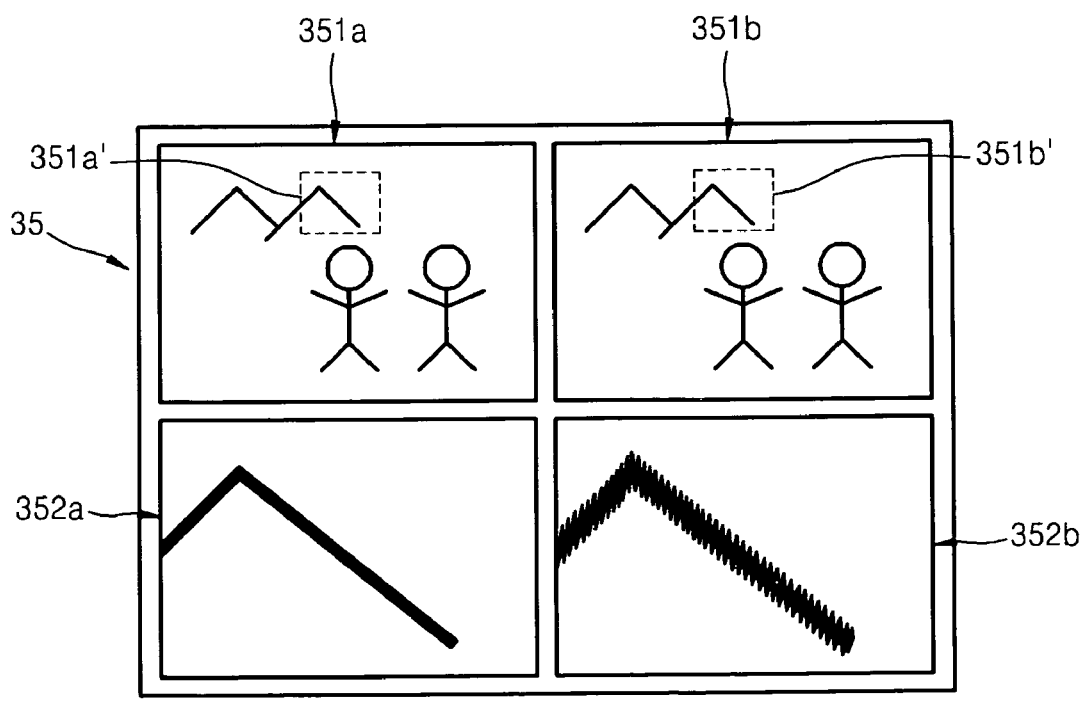
FIG. 5 is an example of images displayed on the display panel using a method of controlling the digital photographing apparatus according to another embodiment of the present invention.

Unlike the above example, the parts of the first images 351a and 351b corresponding to the second images 352a and 352b may be variable when the photographed images are displayed on the display panel 35. That is, referring to FIG. 3, the second images 352a and 352b are enlarged images of the center parts of the first images 351a and 351b, however, the second images 352a and 352b may be the enlarged images of upper left parts of the first images 351a and 351b as shown in FIG. 5. As described above, when the photographed images are displayed on the display panel 35, the parts of the first images 351a and 351b corresponding to the second images 352a and 352b can be automatically changed with the passage of time, and in particular, center points of the parts of the first images 351a and 351b corresponding to the second images 352a and 352b can be moved.

The parts of the first images 351a and 351b, which correspond to the second images 352a and 352b, can be set by the user before the photographed images are displayed on the display panel 35, or can be set or moved by the user when the photographed images are displayed on the display panel 35. In the latter case, the user moves the indication lines 351a' and 351b' on the first images 351a and 351b when the photographed images are displayed on the display panel 35, and accordingly, the second images 352a and 352b can be changed. In this case, the user can use the buttons on the digital photographing apparatus in order to move the indication lines 351a' and 351b' on the first images 351a and 351b, for example, the functional buttons 15 shown in FIG. 2 can be used. That is, the user can move the indication lines 351a' and 351b' on the first images 351a and 351b using an up button 15U, a down button 15D, a left button 15L, and a right button 15R. In addition, a central functional button 15M can be used as a menu/confirm button, or as a select/delete button that will be described later with reference to FIG. 6.

Figure 6:
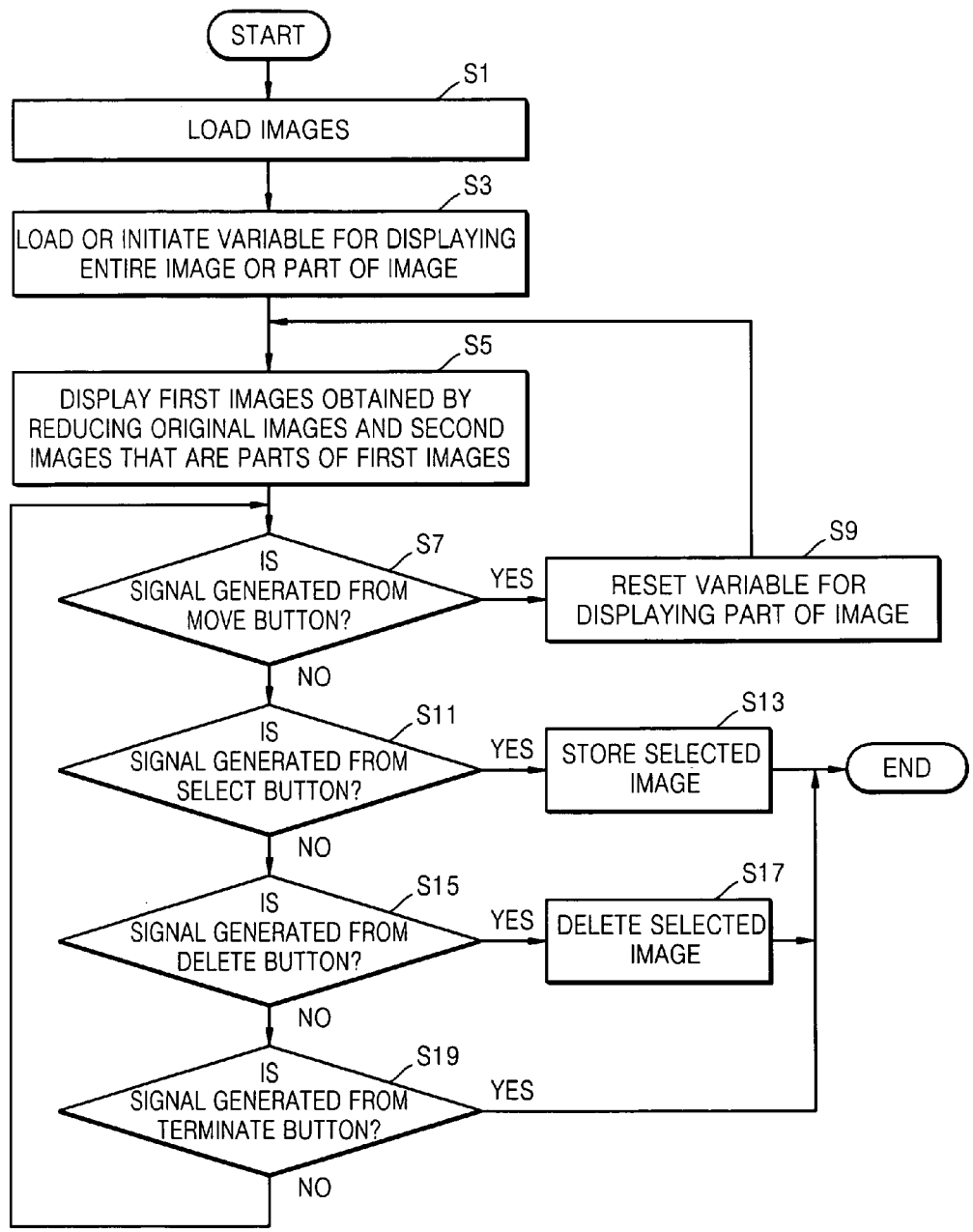
FIG. 6 is a flowchart illustrating a method of controlling the digital photographing apparatus according to another embodiment of the present invention.

FIG. 6 is a flow chart illustrating a method of controlling the digital photographing apparatus, in which the parts of the first images 351a and 351b corresponding to the second images 352a and 352b can be changed by the user when the photographed images are displayed on the display panel 35, according to an embodiment of the present invention.

Referring to FIG. 6, the photographed images are loaded (S1), and a predetermined variable is loaded or initialized for displaying the first images 351a and 351b obtained by reducing the photographed images as a whole and the second images 352a and 352b that correspond to the first images 351a and 351b on the display panel 35 (S3). The variable is for aligning positions of the parts of the first images 351a and 351b and the parts of the second images 352a and 352b on the display panel 35 in order to display the first and second images 351a and 351b, and 352a and 352b on the display panel 35. Through the above processes, the first images 351a and 351b representing the original whole images and the second images 352a and 352b that correspond to the first images 351a and 351b are displayed on the display panel 35 (S5).

After that, it is determined whether a signal is generated by a move button (functional button) (S7), and when the signal is generated by the move button, the variable for displaying some parts of the images is reset (S9), and accordingly, the first images 351a and 351b and the changed second images 352a and 352b are displayed on the display panel 35 (S5).

In addition, if necessary, it is determined whether a signal is generated by a select button (S11), and a selected image among the displayed images can be stored when the signal is generated by the select button (S13). Also, if necessary, it is determined whether a signal is generated by a delete button (S15), and a selected image among the displayed images can be deleted when the signal is generated (S17). In addition, it is determined whether a signal is generated by a terminate button that terminates the display mode (S19), and the corresponding process is terminated when the signal is generated.

In addition, in the method of controlling the digital photographing apparatus for simultaneously displaying the first images 351a and 351b that are the reduced images of the original images and the second images 352a and 352b that correspond to the first images 351a and 351b on the display panel 35, according to the current embodiment of the present invention, the first images 351a and 351b and the second images 352a and 352b can be displayed on the display panel 35 right after the user photographs the subject. In this case, after the photographed images are stored in a temporary memory such as a buffer, it is determined whether a signal is generated by the select button (S15), and then, if a signal is generated, a selected image among the displayed images is stored in a storage medium (S13). In addition, if a signal is not generated, it is determined whether a signal is generated by the stop button (S19) without performing the process of determining whether the signal is generated by the delete button (S15), so that the images that are not selected from the displayed images can be automatically deleted from the temporary memory.

In addition, according to the method of displaying the first images 351a and 351b, and the second images 352a and 352b on the display panel 35, according to the current embodiment of the present invention, when the user photographs the subject, the photographed image can be stored in the storing medium, and later, the first images 351a and 351b and the second images 352a and 352b can be displayed on the display panel 35 according to the selection of the user. In this case, the process of determining whether a signal is generated from the select button (S11) and the process of storing the image (S13) shown in FIG. 6 may not be performed while the process of determining whether the signal is generated from the delete button (S15) and the process of deleting the selected image among the displayed images (S17) when the signal is generated from the delete button may be performed.

Figure 7:
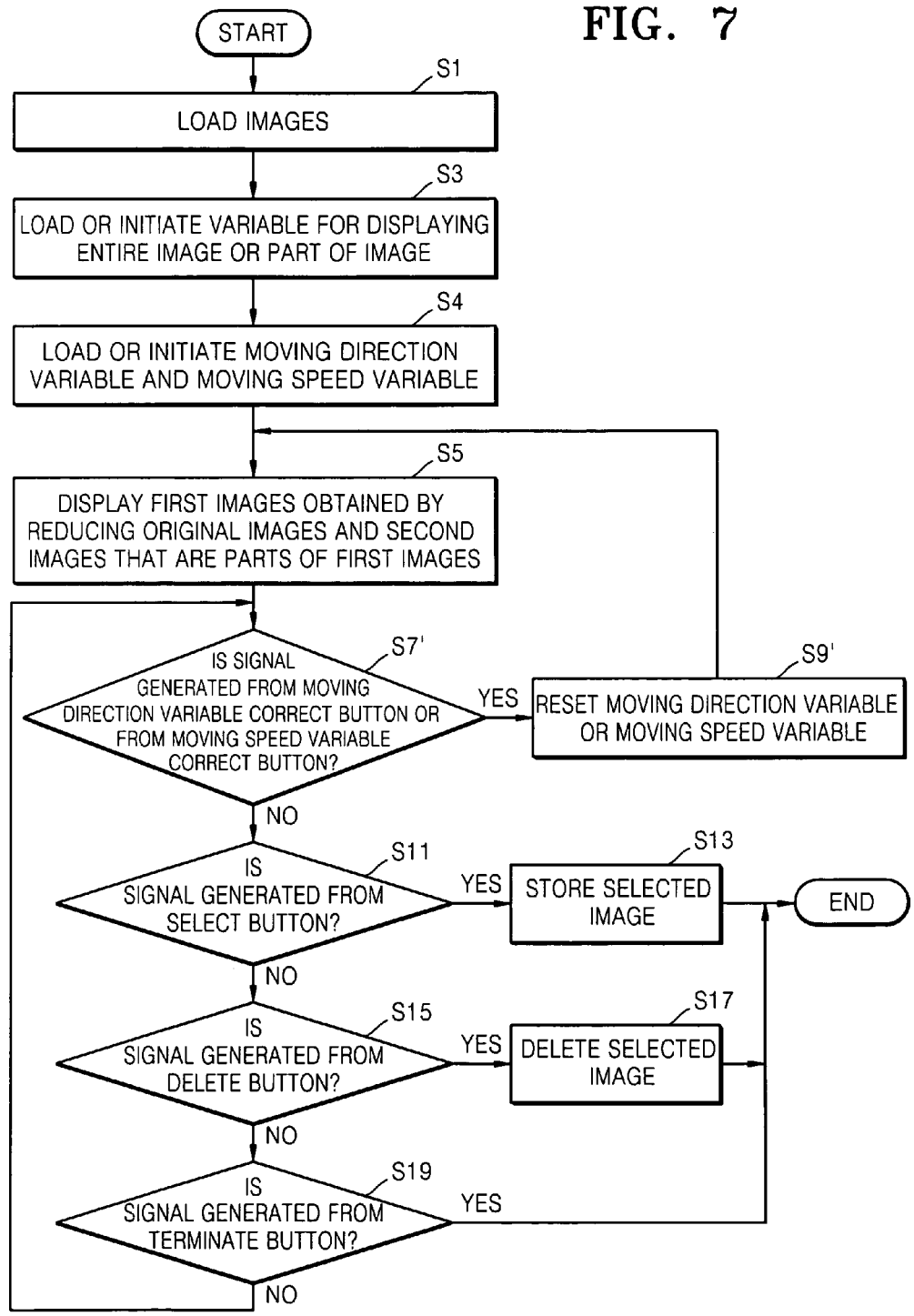
FIG. 7 is a flowchart illustrating a method of controlling the digital photographing apparatus according to another embodiment of the present invention.

Meanwhile, the parts of the first images 351a and 351b corresponding to the second images 352a and 352b may be moved automatically if necessary. FIG. 7 is a flow chart illustrating a method of automatically changing parts of the first images 351a and 351b corresponding to the second images 352a and 352b, according to an embodiment of the present invention. Unlike the method of FIG. 6, a process of loading or initializing a moving direction variable and a moving speed variable (S4) is further performed, and a process of determining whether a signal is generated from a moving direction variable correct button or a moving speed variable correct button after displaying the first and second images 351a and 351b, and 352a and 352b on the display panel 35 (S7') and a process of resetting the moving direction variable and the moving speed variable when the signal is generated (S9') are performed. The resetting of the moving direction variable and the moving speed variable can be performed using the various buttons included in the digital photographing apparatus of FIG. 1, for example, the functional buttons 15. The parts of the first images 351a and 351b corresponding to the second images 352a and 352b can be moved along a predetermined path, for example, in a clockwise direction, or can be moved in a random direction.

Figure 8:
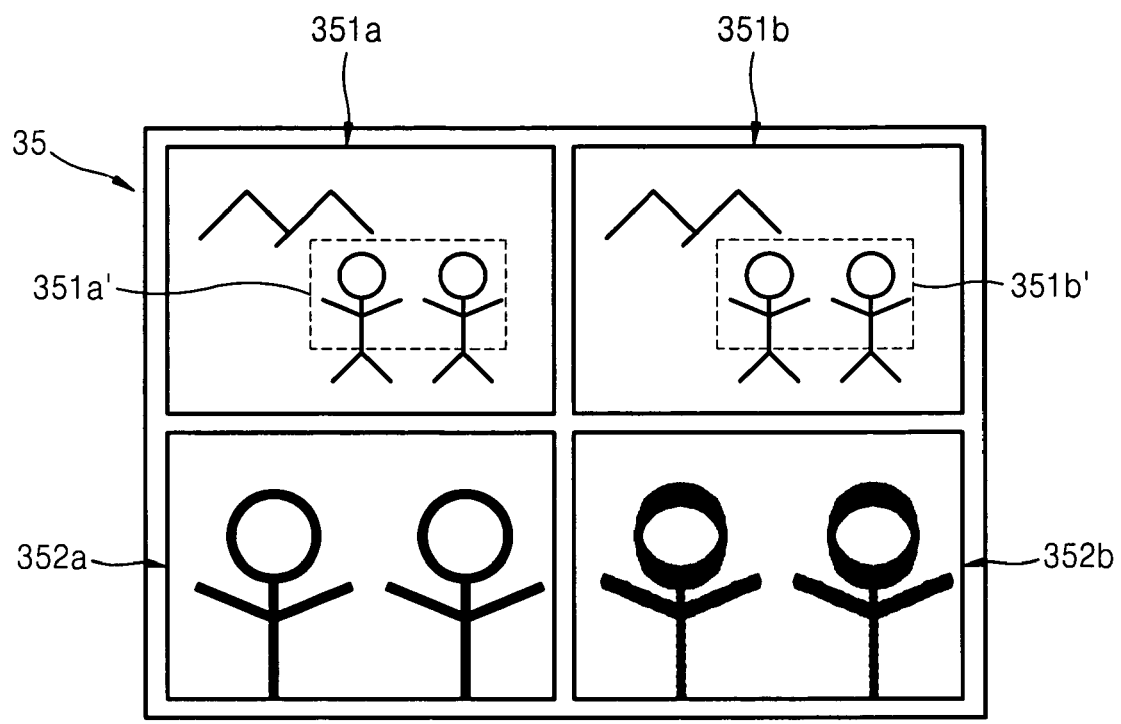
FIG. 8 is an example of images displayed on the display panel using a method of controlling the digital photographing apparatus according to another embodiment of the present invention.

In addition, the parts of the first images 351a and 351b corresponding to the second images 352a and 352b can be automatically changed with the passage of time when the photographed images are displayed on the display panel 35, and in particular, areas of the parts becoming the second images 352a and 352b can be variable. For example, comparing the second images 352a and 352b of FIG. 3 with the second images 352a and 352b of FIG. 8, the areas of the parts corresponding to the second images 352a and 352b, that is, the areas of the parts denoted by the indication lines 351a' and 351b', are different from each other.

Figure 9:
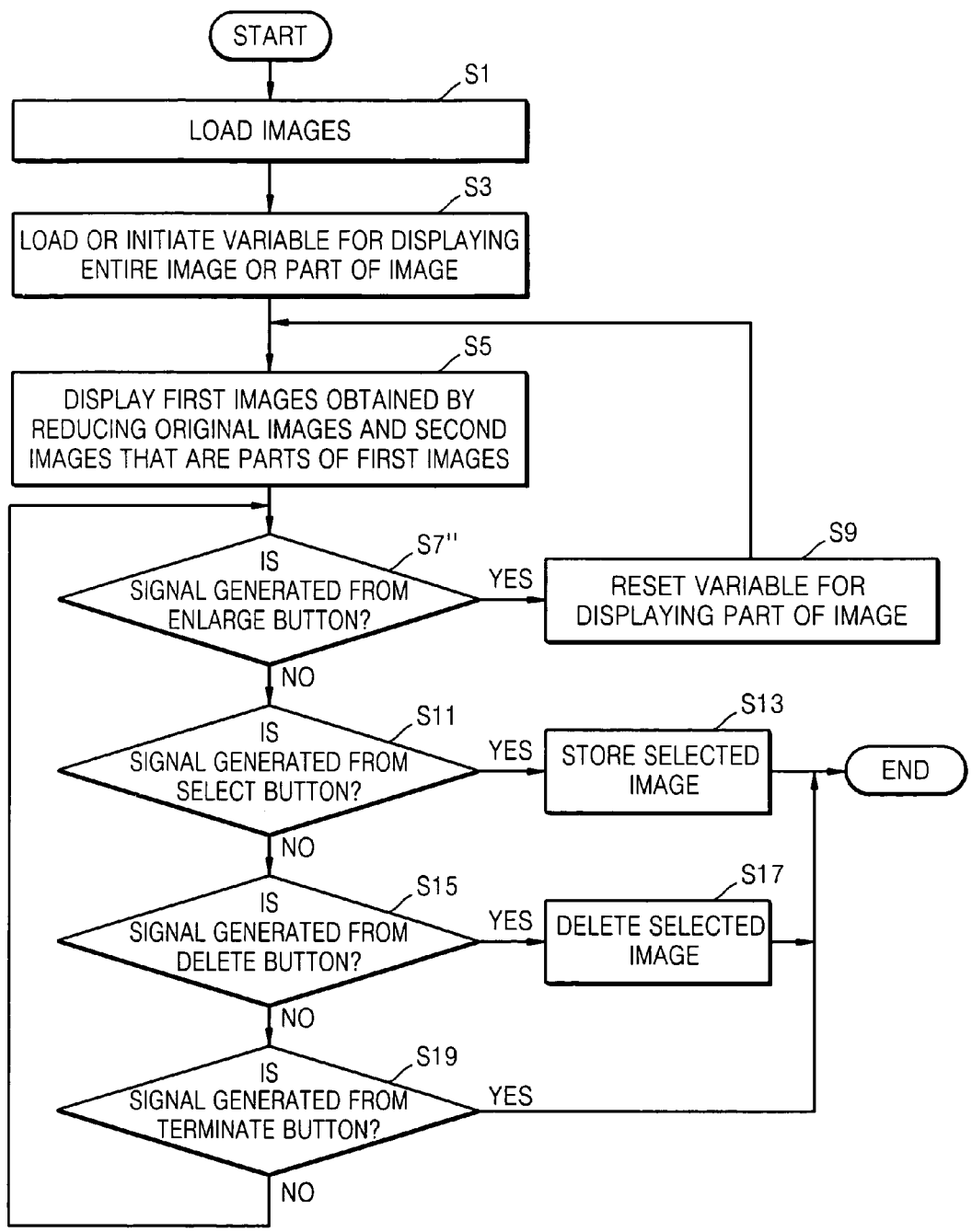
FIG. 9 is a flowchart illustrating a method of controlling the digital photographing apparatus according to another embodiment of the present invention.

As described above, the sizes of the parts of the first images 351a and 351b, which correspond to the second images 352a and 352b, can be adjusted. The areas of the parts of the first images 351a and 351b, which correspond to the second images 352a and 352b, can be changed according to a predetermined setting of the user, or can be changed randomly. In addition, when the first images 351a and 351b and the second images 352a and 352b are displayed on the display panel 35, the parts to be represented as the second images 352a and 352b in the first images 351a and 351b can be adjusted using various buttons. FIG. 9 is a flow chart illustrating the above controlling method according to an embodiment of the present invention. Referring to FIG. 9, a process of determining whether a signal is generated by an enlarge button (S7") is performed to reset the variable for displaying a part of the image from the signal.

According to the method of controlling the digital photographing apparatus and the digital photographing apparatus using the method of the present invention, the quality of a photographed image can be easily determined from the image displayed on the display panel of the digital photographing apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a digital photographing apparatus, the method comprising:
performing a photographing operation in two or more photographing modes to obtain photographed images in response to one activation of a shutter button;
displaying simultaneously on a display panel (1) a plurality of first images obtained by reducing the photographed images, and (2) a plurality of second images that correspond to parts of the first images on a display panel at the same time; and
wherein the areas of the parts of the first images corresponding to the second images are changed randomly by the digital photographing apparatus.

2. The method of claim 1, wherein the second images are reduced images of the original photographed images having a smaller reduction ratio than that of the first images, are the same size as the original photographed images, or are enlarged images of the original photographed images.

3. The method of claim 2, wherein the reduction ratio or an enlargement ratio of the second images is set by a user prior to performing the photographing operation.

4. The method of claim 2, wherein the reduction ratio or the enlargement ratio of the second images can be changed by the user when the photographed images are displayed on the display panel.

5. The method of claim 1, wherein the second images correspond to parts of the first images set by the user prior to performing the photographing operation.

6. The method of claim 1, wherein the second images correspond to generally central parts of the first images.

7. The method of claim 1, wherein the parts of the first images corresponding to the second images are automatically changed with the passage of time when the photographed images are displayed on the display panel.

8. The method of claim 7, wherein centers of the parts of the first images corresponding to the second images can be moved.

9. The method of claim 8, wherein the centers of the parts of the first images corresponding to the second images are moved along a path set by the user prior to performing the photographing operation.

10. The method of claim 8, wherein the centers of the parts of the first images corresponding to the second images are moved randomly.

11. The method of claim 7, wherein areas of the parts of the first images corresponding to the second images are changed.

12. The method of claim 11, wherein the areas of the parts of the first images corresponding to the second images are changed according to a setting determined by the user prior to performing the photographing operation.

13. The method of claim 1, wherein indication lines denoting the parts corresponding to the second images are represented on the first images.

14. The method of claim 13, wherein the position of the indication lines can be moved by the user when the photographed images are displayed on the display panel, and the second images are changed according to the movement of the indication lines.

15. The method of claim 1, wherein the images obtained are of same subject.

16. The method of claim 1, wherein the two or more photographing modes comprise one selected from the group consisting of a normal mode, a shake reduction mode, a flash mode, an exposure adjust mode, a sensitivity adjust mode, an aperture adjust mode, and a shutter speed adjust mode.

17. The method of claim 1, further comprising:
storing a first image selected from the plurality of first images.

18. The method of claim 1, further comprising:
deleting a first image selected from the plurality of first images.

19. A digital photographing apparatus using the method of claim 1.

20. A method of controlling a digital photographing apparatus, the method comprising:
performing a photographing operation in two or more photographing modes to obtain photographed images in response to one activation of a shutter button; and
displaying simultaneously on a display panel (1) a plurality of first images obtained by reducing the photographed images, and (2) a plurality of second images that correspond to parts of the first images on a display panel at the same time;
wherein the second images are reduced images of the original photographed images having a smaller reduction ratio than that of the first images, are the same size as the original photographed images, or are enlarged images of the original photographed images having a larger enlargement ratio than that of the first images;
wherein the reduction ratio or the enlargement ratio of the second images is automatically changed with the passage of time when the photographed images are displayed on the display panel.

21. The method of claim 20, wherein the change of the reduction ratio or the enlargement ratio of the second images is set by the user prior to performing the photographing operation.

* * * * *